Nov. 4, 1924.
E. BERGMAN
SNOW CLEARING MACHINE
Filed June 1, 1922  2 Sheets-Sheet 1
1,514,248
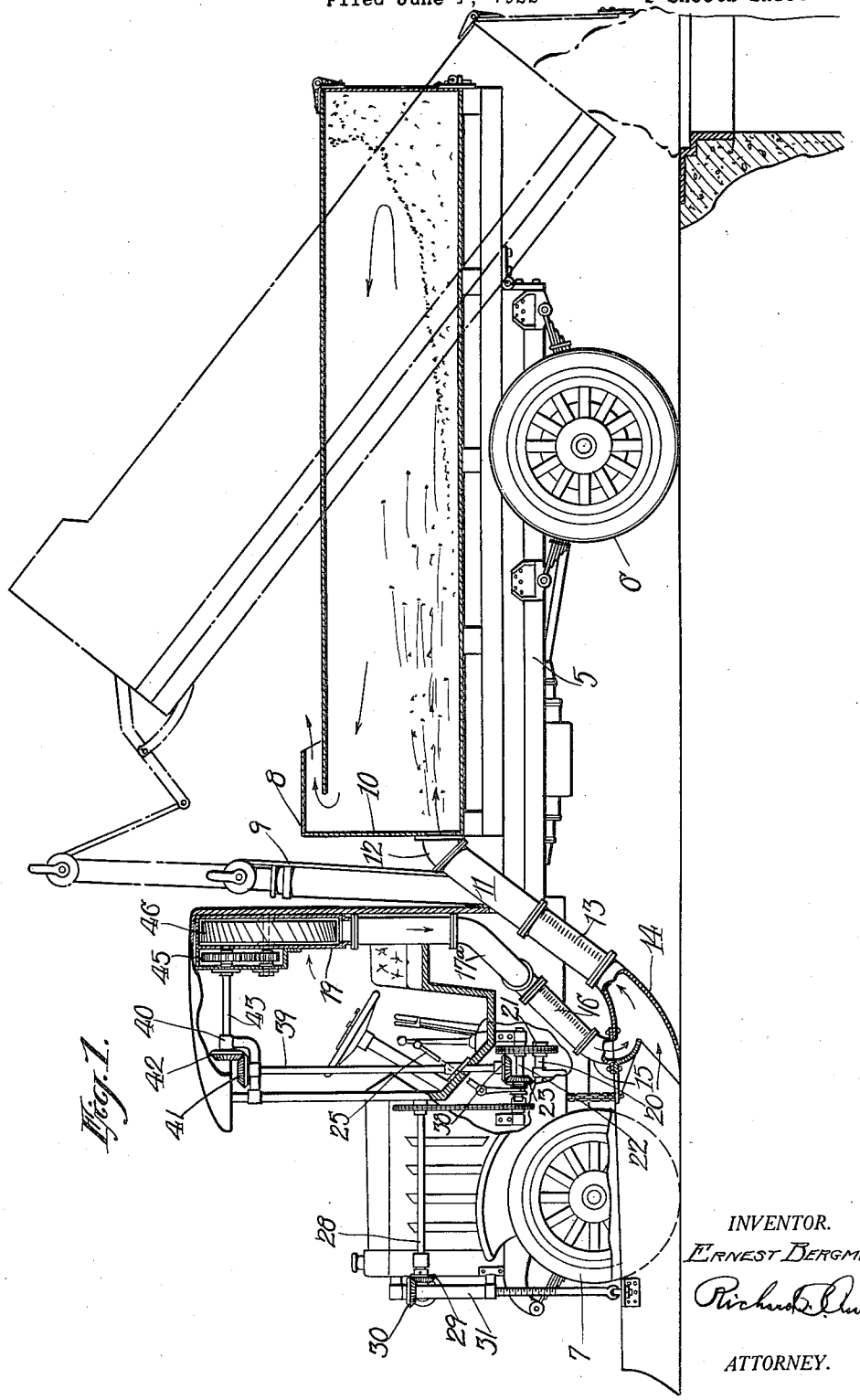
INVENTOR.
ERNEST BERGMAN.
ATTORNEY.

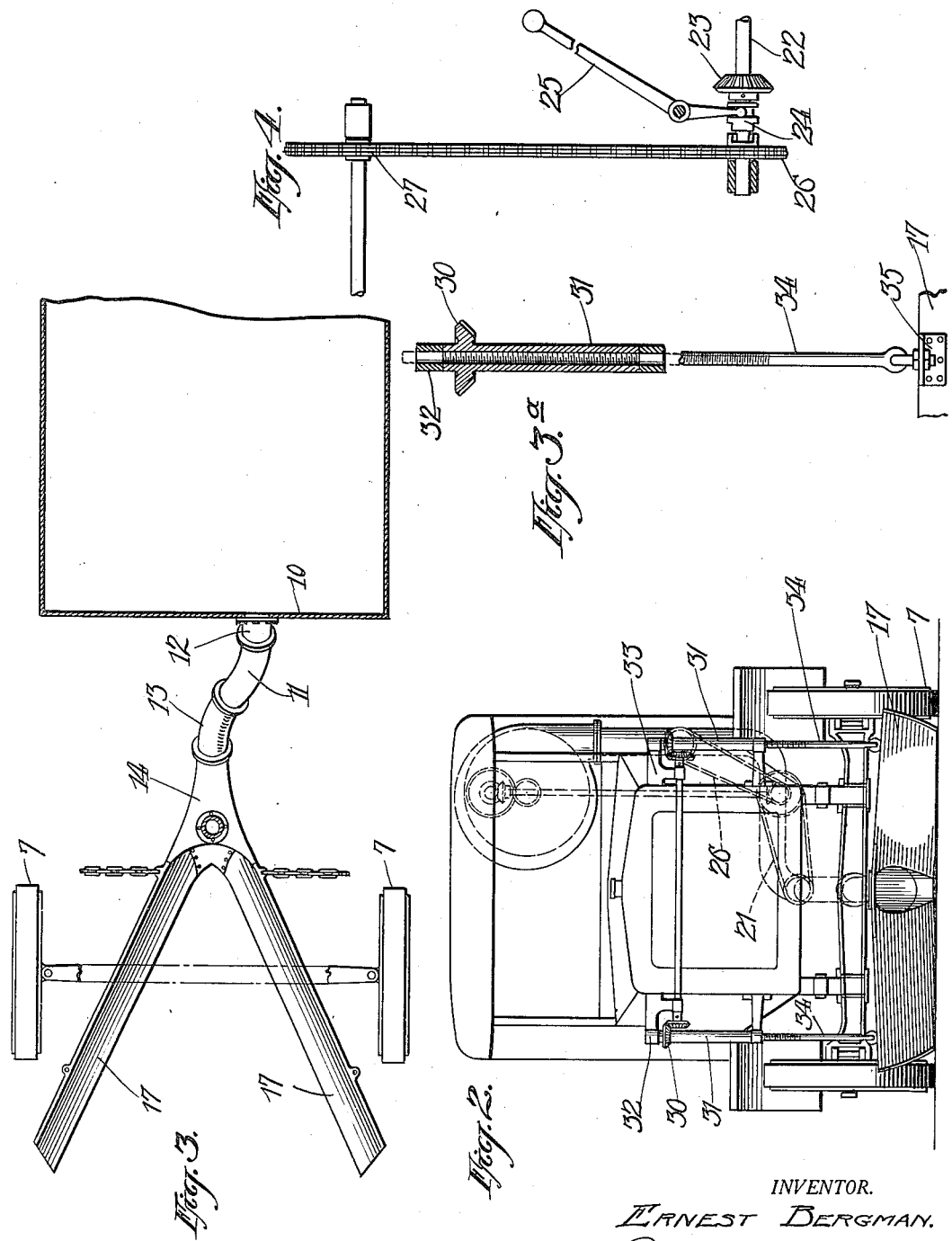

Patented Nov. 4, 1924.

1,514,248

UNITED STATES PATENT OFFICE.

ERNEST BERGMAN, OF CARMEL, NEW YORK.

SNOW-CLEARING MACHINE.

Application filed June 1, 1922. Serial No. 565,072.

*To all whom it may concern:*

Be it known that I, ERNEST BERGMAN, a citizen of Sweden, residing at Carmel, in the county of Putnam and State of New York, have invented certain new and useful Improvements in Snow-Clearing Machines, of which the following is a specification.

This invention relates to snow clearing motor driven machines and more particularly to a novel and improved motor truck especially adapted for removing snow from streets and highways.

The primary object of my invention is the provision of a power driven truck having forwardly diverging, connected snow plows, and a trap and rearwardly inclined chute including an artificial draft creating mechanism operable from the motor of the vehicle whereby the snow may be forced upwardly through the trap and chute into the body portion of the truck during the forward progress of the machine.

Another and equally important object of my invention is the provision of a motor vehicle truck wherein a fan is constantly driven from the motor so as to create an artificial heavy draft of air at a point rearwardly of a pair of snow plows so that the snow may be driven upwardly and rearwardly into the vehicle body, including means for mechanically raising and lowering said plows by the operation of the engine.

With these and other objects in view the invention consists in the construction and novel combination of parts hereinafter fully described, illustrated in the accompanying drawing, and pointed out in the subject matter being claimed, it being understood that various changes in the form, proportion, size and minor details of construction may be resorted to without departing from the spirit and scope of the invention.

In the drawings, Figure 1 is a side elevation partly in section showing the draft creating mechanism and the gearing connected up with the engine shaft.

Figure 2 is a front view.

Figure 3 is a detailed plan of the plows and the flexible connection leading to the body of the truck.

Figure 3ª is a detailed sectional view showing the plow elevating means, and

Figure 4 is a detail of the clutch and gearing for disconnecting the elevating mechanism for the plow.

Referring now to the drawings wherein like reference characters designate corresponding parts throughout the several views, 5 designates the chassis, 6 the rear supporting wheels and 7 the front supporting wheels of a conventional type of motor truck having a dumping body 8 and the usual pulley and belt elevating mechanism 9 preferably opposite the engine to raise and lower the body when it is desired to dump the contents thereof in the manner suggested by Figure 1 of the drawing. To the rear wall 10 of the body a large conduit 11 may be secured in any well-known manner as by an elbow 12, the lower end of said conduit 11 having a flexible connection 13 for attachment to the downwardly curved inlet or trap 14. The trap 14 is provided with a coupling 15 on the front top thereof for attachment to a flexible connection 16 leading to a conduit 17ª communicating with a fan casing 19 disposed rearwardly of the driver seat and operable to create a draft of air by the gearing and mechanism further to be described in detail.

The trap 14 may be attached in any well known manner to a pair of forwardly, outwardly, diverging plows 17 which of course tends to direct and force the snow rearwardly and upwardly into the trap 14 whereby it may be forced into the wagon body by the draft of air created.

The mechanism for raising and lowering the plows 17 and the trap 14 to their inoperative position is connected up to the engine shaft 20 as follows. The shaft 20 is provided with a sprocket and chain gearing 21 which drives a longitudinal stub shaft 22, the last mentioned shaft having a bevelled gear 23 thereon and a clutch 24 which may be thrown into and out of engagement by the clutch lever 25 by the position at the driver's seat. The sprocket and chain gearing 26, 27 driven from the shaft 22 operates the longitudinal shaft 28, the last mentioned shaft having a bevelled gear 29 in constant engagement with the bevelled gear 30 preferably formed integral with a threaded sleeve 31. The threaded sleeves 31 on each side of the machine are held by the collars 32 on the cross frame 33 and receive the threaded rods 34 attached at their lower ends to a bracket 35 secured to the plows 17. It will thus be seen that upon rotation of the threaded sleeve 31 the rods 34 will raise and lower to the desired degree at which point the clutch lever 25 may be actuated to disconnect the raising and lowering mechanism above set forth.

The bevelled gear 23 above referred to is constantly in mesh with a bevelled gear 38 on the lower end of a vertically extending shaft 39 supported in suitable bearings of a bracket 40. A bevelled gear 41 on the upper end of the shaft 39 is constantly in mesh with a second gear 42 of a short shaft 43 extending through the fan casing. Suitably mounted meshed gears 45 arranged to operate the fan shaft and the fan 46 are provided so that the constant draft of air created and entering the conduit 17 will force the snow or any accumulated matter in the trap 14 upwardly and into the body of the truck as heretofore set forth.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:—

1. In a snow clearing machine, the combination with a motor truck and its body, diverging plows disposed in front of said body, an inclined chute having an upwardly and rearwardly curved trap attachable to the rear of said plows, said chute being flexibly connected to the vehicle body, gearing operable from the engine drive shaft for raising and lowering the plows and chute as a unit, a clutch for rendering said gearing inoperative and a constantly driven fan operable from the engine drive shaft for creating a forced draft of air in the bottom of the trap to drive the accumulated material toward the rear of the said vehicle body.

2. In a snow clearing machine, the combination with a motor truck and its body, diverging plows positioned in front of said body, an inclined chute having a trap in the bottom thereof, attached to the rear of the said plows, means operable from the motor to raise the said plows and trap as a unit and a blower operable from the motor for forcing the accumulated material between the said plows upwardly through the trap and into the rear of the said vehicle body.

In testimony whereof I affix my signature in presence of two witnesses.

ERNEST BERGMAN. [L. S.]

Witnesses:
CARL OSTINOL,
JAMES KEHOE.